W. H. FOX.
SCISSORS GRINDER.
APPLICATION FILED APR. 28, 1915.

1,170,236.

Patented Feb. 1, 1916.

Witnesses

Inventor
Wellington H. Fox
By Victor J. Evans
Attorney

UNITED STATES PATENT OFFICE.

WELLINGTON H. FOX, OF PHILADELPHIA, PENNSYLVANIA.

SCISSORS-GRINDER.

1,170,236.

Specification of Letters Patent. Patented Feb. 1, 1916.

Application filed April 28, 1915. Serial No. 24,555.

*To all whom it may concern:*

Be it known that I, WELLINGTON H. FOX, a citizen of the United States, residing at Philadelphia, in the county of Philadelphia and State of Pennsylvania, have invented new and useful Improvements in Scissors-Grinders, of which the following is a specification.

The invention relates to a grinder, and more particularly to the class of scissors grinders.

The primary object of the invention is the provision of a device of this character wherein a rotary emery or carborundum stone is supported in a novel manner so that the blades of scissors can be positioned relative to the stone, whereby on reciprocating the blade the said stone will be rotated for the sharpening of the said blade.

Another object of the invention is the provision of a grinder of this character wherein the sharpening stone is mounted in a novel manner within a frame which is formed with a guide for the blade of the scissors so that the latter can be quickly and conveniently sharpened.

A further object of the invention is the provision of a grinder of this character which is extremely simple in construction, thoroughly reliable and efficient in its operation, strong, durable, and inexpensive in manufacture.

With these and other objects in view, the invention consists in the construction, combination and arrangement of parts as will be hereinafter fully described, illustrated in the accompanying drawing, and pointed out in the claim hereunto appended.

Figure 1:
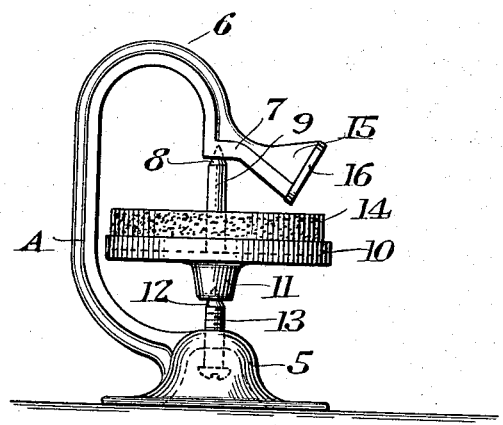
Figure 2:
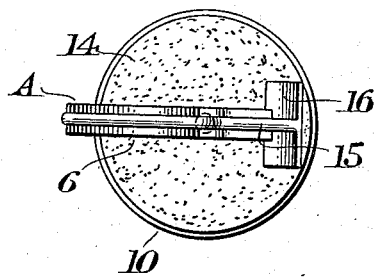

In the drawing: Figure 1 is a side elevation of a grinder constructed in accordance with the invention. Fig. 2 is a top plan view thereof.

Similar reference characters indicate corresponding parts throughout the several views in the drawing.

Referring to the drawing in detail, the grinder comprises a support A having a base 5 formed with a gooseneck 6 serving as a frame, which is provided with a bearing shoulder 7 into which is journaled the pointed end 8 of a spindle 9 rising from a turn-table 10 formed with a depending boss 11 serving as a bearing into which engages the pointed end 12 of an adjusting screw 13 threaded in the base 5, the said screw being in vertical alinement with the spindle 9 for the centering of the turn table 10, and by this spindle and screw the turn table is rotatably supported in the frame.

Mounted within a suitable counter-seat in the turn-table 10 is an emery or carborundum stone 14 which is disposed concentrically about the spindle 9 and serves as a sharpener for scissors blades. Formed on the frame 6 is an angular arm 15 provided with a guide 16 against which rests the blade of the scissors when its beveled cutting edge is in contact with the upper face of the emery or carborundum stone. On reciprocating the blade of the scissors the emery or carborundum stone 14 is caused to rotate, thus acting upon the beveled edge of the blade for the sharpening thereof.

From the foregoing description, taken in connection with the accompanying drawing, the construction and manner of operation of the device will be clearly understood, and therefore a more extended explanation has been omitted.

What is claimed is:—

A grinder of the class described comprising a base having a central hollow swell rising therefrom and also provided with a goose-neck serving as a frame, a bearing shoulder formed on the frame in vertical alinement with the swell and having a socket therein, a pointed screw adjustably threaded centrally in the swell, a turn-table formed with a central depending boss having a socket receiving the pointed end of the screw, a pintle rising centrally from the said turn-table and having a pointed end engaged in the socket in the bearing shoulder, a sharpening stone seated in the turn-table and disposed concentrically about the spindle, and an angularly disposed guide on the said goose-neck.

In testimony whereof I affix my signature in presence of two witnesses.

WELLINGTON H. FOX.

Witnesses:
M. GETZ,
EDMUND J. GLASER.

Copies of this patent may be obtained for five cents each, by addressing the "Commissioner of Patents, Washington, D. C."